June 15, 1965  A. F. OATLEY  3,188,940
GRILLING APPLIANCE

Filed Aug. 14, 1959  3 Sheets-Sheet 1

Inventor
Arthur F. Oatley
By Ralph B. Stewart
Attorney

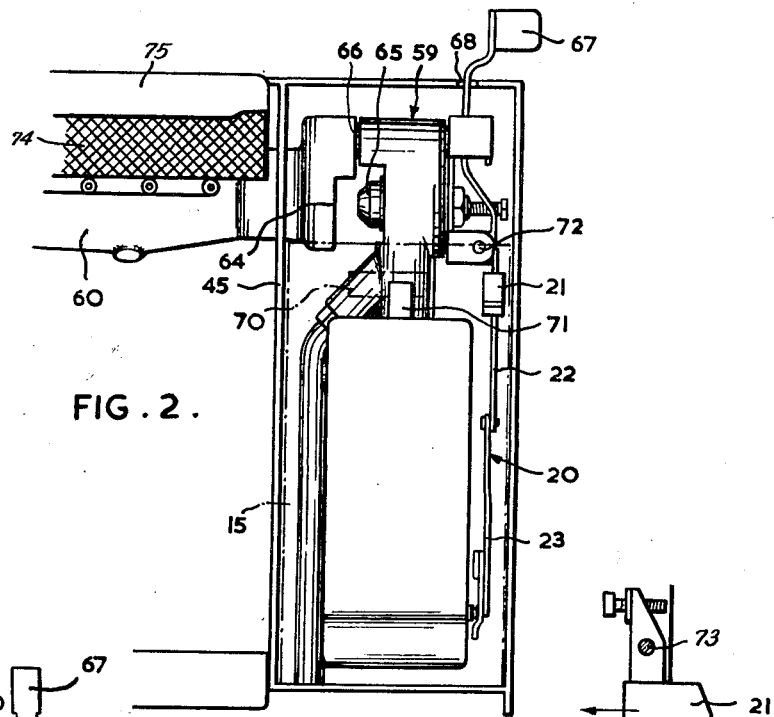
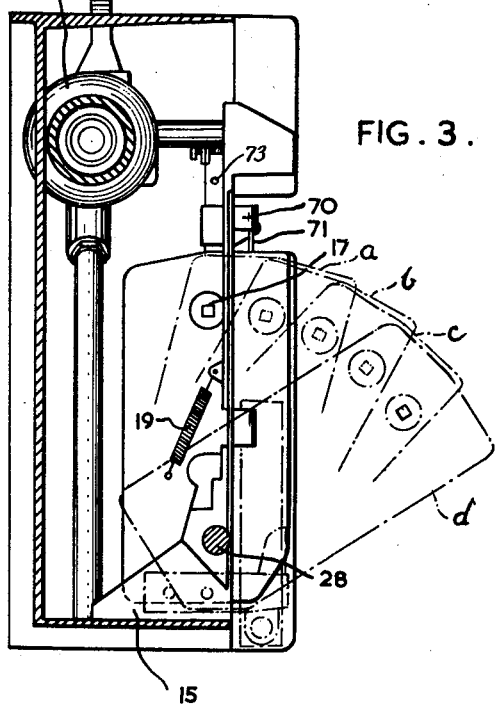
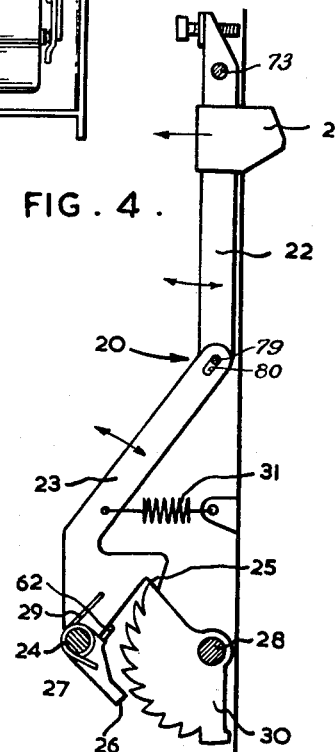

June 15, 1965  A. F. OATLEY  3,188,940
GRILLING APPLIANCE
Filed Aug. 14, 1959  3 Sheets-Sheet 3

Inventor
Arthur F. Oatley
By Ralph B. Stewart
Attorney

United States Patent Office 3,188,940
Patented June 15, 1965

3,188,940
GRILLING APPLIANCE
Arthur Frederick Oatley, Wilton Lodge, Wergs Road,
Tettenhall, Wolverhampton, Staffordshire, England
Filed Aug. 14, 1959, Ser. No. 833,834
4 Claims. (Cl. 99—421)

This invention relates to grilling appliances and more particularly to means for mounting and rotating a spit under the radiant.

The present invention consists in a grilling appliance having a radiant surface and comprising means for rotatably supporting a spit in any of a variety of positions at differing distances from the radiant surface and normal to it when the radiant surface is in the position of use.

The radiant surface of the grill in the position of use may be vertical or horizontal and above the spit. The invention is especially suitable for use with folding grills whether independent units or fitted at the top of the cooker splash-back as "eye-level" grills, or with fixed "eye-level" grills.

One of the pair of spaced members may be a power unit or a part thereof as described in British patent application No. 14,009/58 which is movable between a stored position within a supporting structure and a position of use in which it projects from the supporting structure. The present invention provides adjustment in the position of use of the distance of the spit from the radiant surface.

The invention will now be described by way of example with reference to the accompanying drawings in which:

FIGURE 2 is a fragmentary front view of the grilling appliance showing a power unit for use in rotating a spit which can be used with the grill.

FIGURE 3 is a section on line 3—3 of FIGURE 1 showing a side view of the power unit.

FIGURE 4 is a detail view of means for producing step by step adjustment of the power unit.

Figure 1:
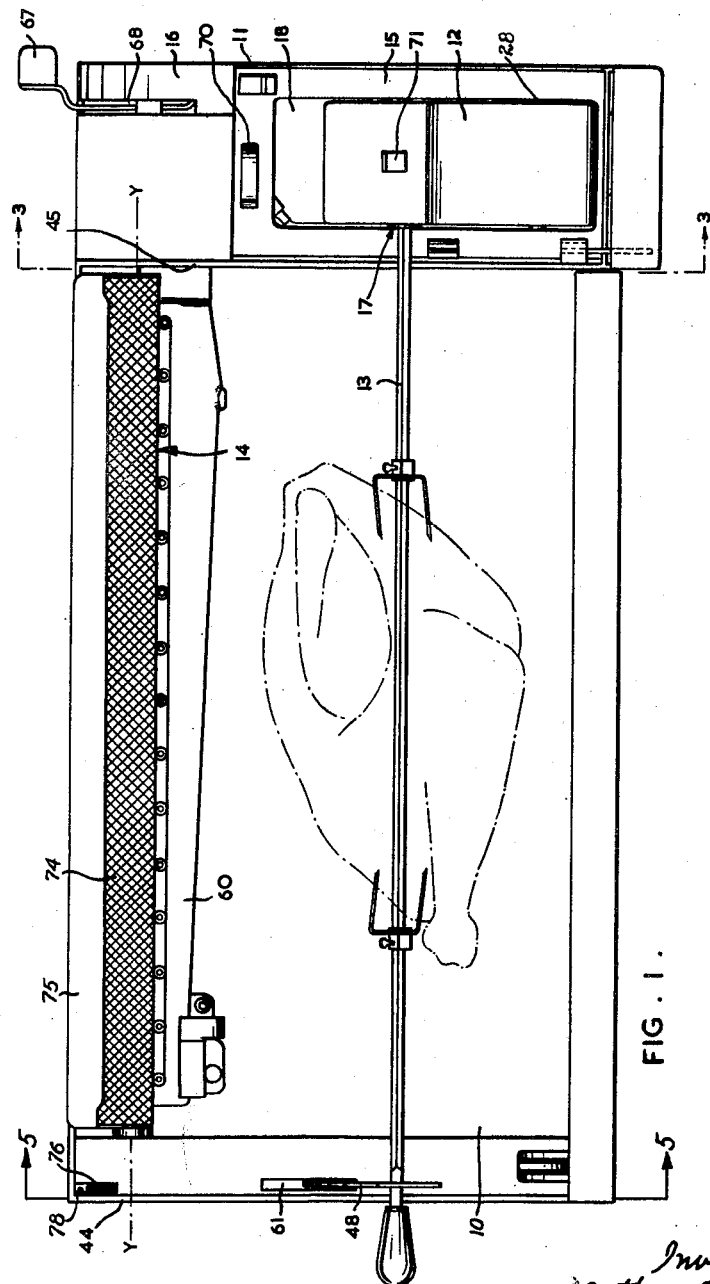
FIGURE 1 is a front view of a grilling appliance in the position of use.

The grilling appliance which has illustrated in FIGURE 1 is an independent unit may equally well be fitted as an eye-level grill above a cooker hotplate. The appliance has a supporting structure 11 in the form of a sheet metal casing which includes a recess 10 in which a radiant 14 is carried by parallel side members 43 pivotally mounted on the supporting structure between the ends of and near the top of the recess 10 for movement about a horizontal axis Y—Y between a horizontal position of use and a stored position in which the radiant 14 is received within the recess 10. The radiant, in this example, is of the kind having a single radiant comprising an expanded metal fret 74 provided with and retained by a sheet metal outer cover 75. A burner 60 is provided in and near the top of the recess 10 which when the radiant is in the horizontal in use position extends along the near edge of the radiant and is so arranged that burner flame plays on the underside thereof to heat the radiant. A food support 32 is hinged near its lower edge to the supporting structure 11 and in the stored position closes the recess 10. At one side of the recess 10 is a power unit 12 for rotating a spit 13 detachably mounted below and horizontally of, the radiant 14. The power unit 12 is mounted on a chassis 15 and is normally enclosed within the casing 16 of the supporting structure 11.

The power unit is of substantially rectangular block shape in which a drive coupling 17 is located towards one end and at the side of the unit and is rigidly mounted near the opposite end on a rod 28, each end of which is received in bearings (not shown) in the chassis 15, for pivotal movement in the chassis about the horizontal longitudinal axis 28 of the rod. To bring the unit into use the end with the drive coupling can be swung outwards from its stored position to project through an opening 18 in the casing. A tension spring 19, FIGURE 3, secured at one end to the chassis 15 and at the other end to the power unit, urges the unit outwards towards the position of use. It is held in the stored position and its movement to and adjustment in its position of use is controlled by a press-button 21 which is exposed for operation through an aperture in the front of the casing forming the supporting structure 11, and which through a linkage arm 22 pivotally mounted at 73 to the chassis above the press-button 21 moves angularly a pallet 23 pivotally mounted at 24 to the chassis. The linkage arm 22, as shown in FIGURE 4, is connected to the pallet 23 by a pin 79 secured to the linkage arm which engages a slot 80 in the pallet. The pallet 23 has acting faces 25 and 26 engageable with an arcuate ratchet 30 rigidly mounted on the rod to pivot with the power unit about the longitudinal axis of the rod 28. The acting face 25 is formed by a projecting part of the pallet and the acting face 26 is formed by a pawl 27 pivotally connected to the main part of the pallet at 24 and urged by a spring 29 towards the ratchet 30 and against a lug 62 on the main part of the pallet 23. As shown in FIGURE 4 the acting face 25 is normally in engagement with one tooth or stop of the ratchet and the other acting face 26 is held out of engagement with the ratchet by the lug 62, the power unit being held against the action of the spring 19. Depression of the press-button 21 removes the acting face 25 from engagement with the one ratchet tooth and puts the acting face 26 in position to engage a tooth so allowing a tooth-pitch angular movement of the power unit under the influence of the spring 19. Successive operations of the press-button allow the power unit to move in turn to positions a, b, c, and d, indicated in FIGURE 3 by chain-dot lines and in each position the vertical distance from the radiant surface at which the spit is supported is increased. To return the power unit to the stored position it is simply pushed in against the spring force, the acting faces 25 and 26 riding freely over the teeth of the ratchet. A spring 31 maintains the pallet in the correct position for the acting edges to locate the ratchet teeth.

A pan or food support platform 32 is pivotally mounted on the supporting structure 11 by a hinge pin 33 supported by brackets (not shown) on the supporting structure. To bring the radiant 14 from the stored position to the in use position the pan or food support platform 32 is swung outwards and downwards to a horizontal position. An arm 34 pivotally mounted on a hinge pin 33 forms part of a linkage including a connecting member 36 for raising the radiant to the in use position. A cut-away portion 37 in the arm provides some lost motion so that the linkage system does not operate until the pan or food support platform has been lowered to a position "e" FIGURE 5. At this point an inwardly directed flange 38 on the side wall of the support platform bears against an edge 39 of the cut-away portion 37. As the platform 32 is lowered further the arm is made to pivot about the pin 33 thus raising the other end 40 of the arm which is pivotally connected to the lower part 41 of the connecting member 36. The radiant 14 is pivotally mounted by side members 43 between side wall 44 and dividing wall 45 defining the ends of the recess 10. The upper part 42 of the connecting member is pivotally connected to one of the side members 43. As the end of the arm 40 is raised the connecting member 36 is raised vertically and the upper part 42 of the connecting member is pivotally connected to one of the side members 43 at a point between the pivotal axis 35 and the radiant in such a way that the radiant swings outwards and upwards from its vertical stored position, shown in FIGURE 6, to the horizontal position of use. A tension spring 46 attached by one end to a plate 47 fixed firmly to the supporting structure by means of lugs 81 formed on the plate 47 which are riveted or otherwise secured to the supporting structure, and by the other end to the lower part 41 of the connecting member, maintains the radiant 14 in the horizontal position.

Figures 6, 7, 8:
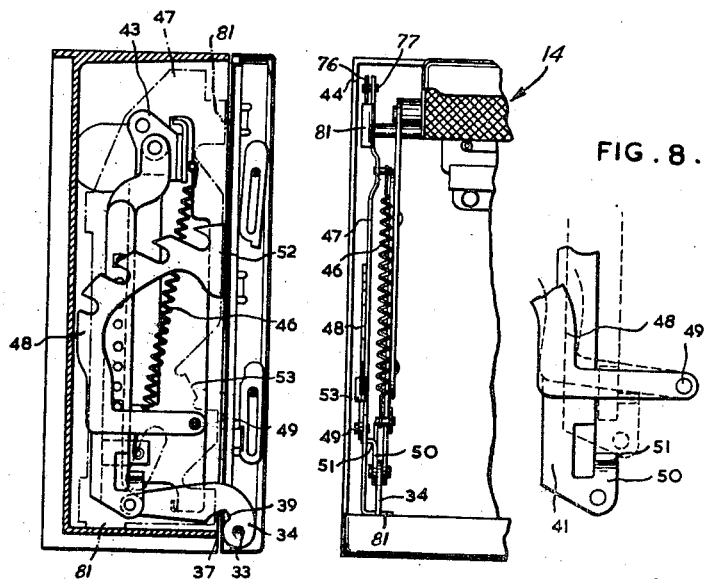
FIGURE 6 is a section on the line 5—5 of FIGURE 1 but with the radiant in the stored position.
FIGURES 7 and 8 are enlarged front and side views of part of the elevating means.

The grill 14 is retained in the stored position by means of a catch 76 pivotally secured by a pin 77 to the plate 47, FIGURE 7, which projects from the front of the casing through a slot 78, FIGURE 1, and which when the platform 32 is closed against the casing enters a slot (not shown) in the platform to engage a hook-shaped leaf spring (not shown) housed in the platform. The catch 76 and the leaf spring are shaped in such a way that they engage with a snap action and the catch can be released from engagement with the leaf spring by using only a little extra manual effort in the initial movement of swinging the platform to the horizontal position.

Figure 5:
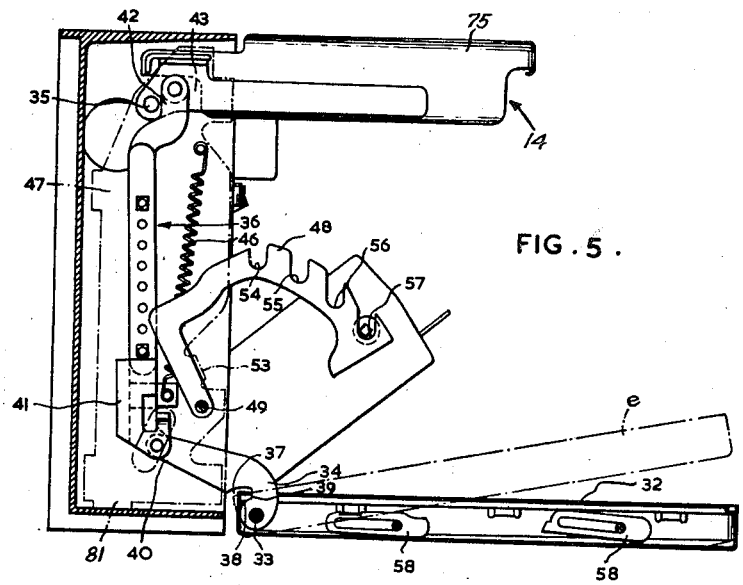
FIGURE 5 is a section on line 5—5 of FIGURE 1 showing detail of the elevating means for raising the grill.

In addition to swinging the radiant into the in-use position the raising mechanism moves an arcuate spit supporting member 48 pivoted at 49 to the plate 47 from its stored position (FIGURE 6) entirely within the casing of the supporting structure, into a position in which it can easily be swung to the position of use (FIGURE 5). This is effected by a projection 50 of the lower part of the connecting member being bent out of the vertical plane to form a lateral lug 51 which bears against the spit supporting member 48, when the connecting member is raised, and moves the supporting member, shown in FIGURE 8 by broken lines, just sufficiently for the free end 52 of the supporting member to project a small amount from the casing through a slot 61. In this position the supporting member can be gripped between finger and thumb and swung out to its fullest extent by hand. Further outward movement from the in use position is prevented by a check 53 provided on the plate 47. To provide a bearing for the spit the supporting member has open-ended oblique slots 54, 55, 56 and 57. There is a slot to support the spit at the same level as the drive coupling of the power unit when in each of the positions *a*, *b*, *c*, or *d*. The open-ends of the slots are upwardly directed when the supporting member is projected forwards for use.

The grill burner 60 is arranged with a gas flow cock 59, as described in British patent specification No. 703,-155 such that gas cannot flow to the gas burner until the radiant 14 is in the operative position nor can the radiant be swung into the inoperative position until the gas is first turned off. The burner is rotatable about its axis, with the radiant, between the operative and inoperative positions. In the operative position the mouth 64 of the burner is in alignment with a cock plug 65 rotatably mounted in the cock body (FIGURE 2). The burner is held in the operative position by the engagement of a spring urged plunger 66, mounted in the cock body, in a hole (not shown) in the end of the burner. A lever 67 controls the gas flow by rotating the cock plug 65. Only when the burner is in the operative position can the lever be moved axially in a slot 68 in the casing of the supporting structure to rotate the cock plug as between "off" and "on" positions. Before the radiant can be stored away the plunger 66 must be disengaged from the hole in the end of the burner and this can only be done when the lever is in the "off" position. By moving the lever laterally about a pin 72 it contacts a head (not shown) on the stem of the plunger and disengages the plunger from the hole. The lever moves into a part of the slot 68 enlarged just sufficiently to receive the lever so that it cannot be moved whilst in that position and it will remain in the enlarged part of the slot until the radiant is swung into the operative position again and the plunger can engage the hole.

A switch 70 controlling the motor of the power unit is mounted in the chassis 15 (FIGURE 1) above the power unit and is wired to the motor by a flexible lead (not shown). The switch 70 is of the kind having an operating member of elongated shape pivotally mounted to rock about a vertical axis parallel to its minor medial axis, for movement between alternative positions in which one end of the operating member or the other protrudes from the front face of the chassis. An interlocking member 71 in the form of an upstanding projection mounted on the top of the power unit bears against and depresses one end of the switch 70 when the power unit is stowed away to maintain the switch in the "off" position (FIGURE 3). When the power unit is swung out to the position of use the other end of the switch can be depressed to switch the motor "on." Should the user forget to switch the motor "off" after use, it is switched "off" automatically when the interlocking member 71 bears against and depresses the switch into the "off" position as the power unit is pushed into the stowed position.

The support platform 32 is preferably of the kind forming the subject of British patent application No. 36,648/58. With this arrangement the bottom is adjustable so that in the event of a large meat joint or bird being grilled on the spit it can be lowered by means of slotted guides 58 to allow more space below the spit.

I claim:

1. A grilling appliance comprising in combination a supporting structure; a radiant mounted on the supporting structure; a power unit having a drive coupling, being pivotally mounted in the supporting structure for movement between a stored position in the supporting structure and a plurality of adjusted operative positions and urged by spring force towards the operative position furthest from the stored position; escapement means including a manually actuable member for permitting step-by-step movement of the power unit under the influence of the spring on successive operations of the manually actuable member; and an arm pivotally mounted in the supporting structure and angularly movable between stored and active positions, the power unit and arm being mounted in the supporting structure on opposite sides of the radiant and adapted to support rotatably a spit in any of a variety of operative positions spaced from the radiant surface and normal to it, one end of the spit being supported by the arm and the other end being supported and driven by the drive coupling.

2. A grilling appliance according to claim 1 wherein the escapement means comprises a toothed ratchet and an angularly movable pallet having acting faces co-operating with the teeth of the ratchet, operation of the manually actuable member causing alternate disengagement of the acting faces from the teeth of the ratchet to allow the prescribed step by step movement.

3. A grilling appliance according to claim 1 wherein the arm has a single active position and locations for the spit corresponding to each operative position of the power unit.

4. A grilling appliance comprising in combination a supporting structure; a radiant mounted on the supporting structure; a power unit having a drive coupling, being pivotally mounted in the supporting structure for movement between a stored position in the supporting structure and a plurality of adjusted operative positions and urged by a spring force towards the operative position furtherest from the stored position; means including a plurality of stops and a stop engaging pallet between said power unit and said supporting structure to selectively hold said power unit in any of a variety of operative positions; and an arm pivotally mounted in the supporting structure and angularly movable between stored and active positions, the power unit and arm being mounted in the supporting structure on opposite sides of the radiant and adapted to support rotatably a spit in any of a variety of operative positions spaced from the radiant surface and normal to it, one end of the spit being supported by the arm and the other end being supported and driven by the drive coupling.

References Cited by the Examiner

UNITED STATES PATENTS

| | | | |
|---|---|---|---|
| 1,085,671 | 2/14 | Day | 99—421 |
| 1,442,584 | 1/23 | Schey | 99—421 |
| 2,502,685 | 4/50 | Warner | 99—421 |
| 2,619,026 | 11/52 | Scott | 99—421 |
| 2,694,392 | 11/54 | Oatley | 126—41 |
| 2,729,160 | 1/56 | Pirz | 99—421 |
| 2,845,856 | 8/58 | Sack | 99—421 |
| 2,900,897 | 8/59 | Fisher | 99—340 |
| 2,972,942 | 2/61 | Goldberg | 99—421 |

FOREIGN PATENTS

| | | |
|---|---|---|
| 487,467 | 12/29 | Germany. |
| 572,816 | 8/31 | Germany. |
| 688,262 | 3/53 | Great Britain. |

ROBERT E. PULFREY, *Primary Examiner.*

GEORGE A. NINAS, JR., NORTON ANSHER, JEROME SCHNALL, *Examiners.*